(12) United States Patent
Nahrwold et al.

(10) Patent No.: US 6,793,398 B2
(45) Date of Patent: Sep. 21, 2004

(54) LOW SPRING RATE MULTI-CONVOLUTED COLLAPSIBLE SPACER

(75) Inventors: Thomas Lee Nahrwold, Ossian, IN (US); Patrick J. Ballinger, Fort Wayne, IN (US); Robert William Sullivan, Fort Wayne, IN (US); Nolan James Knight, Monroeville, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/156,229

(22) Filed: May 29, 2002

(65) Prior Publication Data

US 2003/0223666 A1 Dec. 4, 2003

(51) Int. Cl.[7] .............................................. F16C 19/38
(52) U.S. Cl. ...................................................... 384/563
(58) Field of Search ................................ 384/563, 517, 384/551, 581, 535

(56) References Cited

U.S. PATENT DOCUMENTS

| | | |
|---|---|---|
| 3,774,896 A | 11/1973 | Rode |
| 3,900,232 A | 8/1975 | Rode |
| 4,067,585 A | 1/1978 | Rode |
| 4,125,929 A | 11/1978 | Rode |
| 4,611,935 A | 9/1986 | Rode |
| 5,125,156 A | 6/1992 | Witte |
| 5,549,397 A | 8/1996 | Rode |

FOREIGN PATENT DOCUMENTS

GB      2 316 462 A      2/1998

Primary Examiner—Lenard A. Footland
(74) Attorney, Agent, or Firm—Liniak, Berenato & White (57) ABSTRACT

A low spring rate multi-convoluted collapsible spacer adapted for use as a bearing preloading element. The collapsible spacer comprises a substantially tubular body compressible in an axial direction thereof from a predetermined free length to a substantially shorter length. The tubular body includes a yielding zone and an elastic zone adjacent to said yielding zone. Each of the yielding and elastic zones has at least one convolution curved in the same radial direction. An average thickness of the body of the spacer in the elastic zone is substantially greater than an average thickness of the body in the yielding zone that provides the collapsible spacer a substantially higher resiliency in the axial direction in the elastic zone than in the yielding zone. As a whole, the collapsible spacer has a relatively low spring rate, thus larger amount of "spring back", hence less sensitivity to wear and maladjustment.

12 Claims, 6 Drawing Sheets

LOW SPRING RATE MULTI-CONVOLUTED COLLAPSIBLE SPACER

BACKGROUND OF THE INVENTION

1. Field of the Invention

The present invention relates in general to collapsible spacers adapted to be placed between a pair of bearings mounted on an axle or spindle or the like for use as a bearing preloading element, and more particularly to a multi-convoluted collapsible spacer having a low spring rate.

2. Description of the Prior Art

Figure 1:
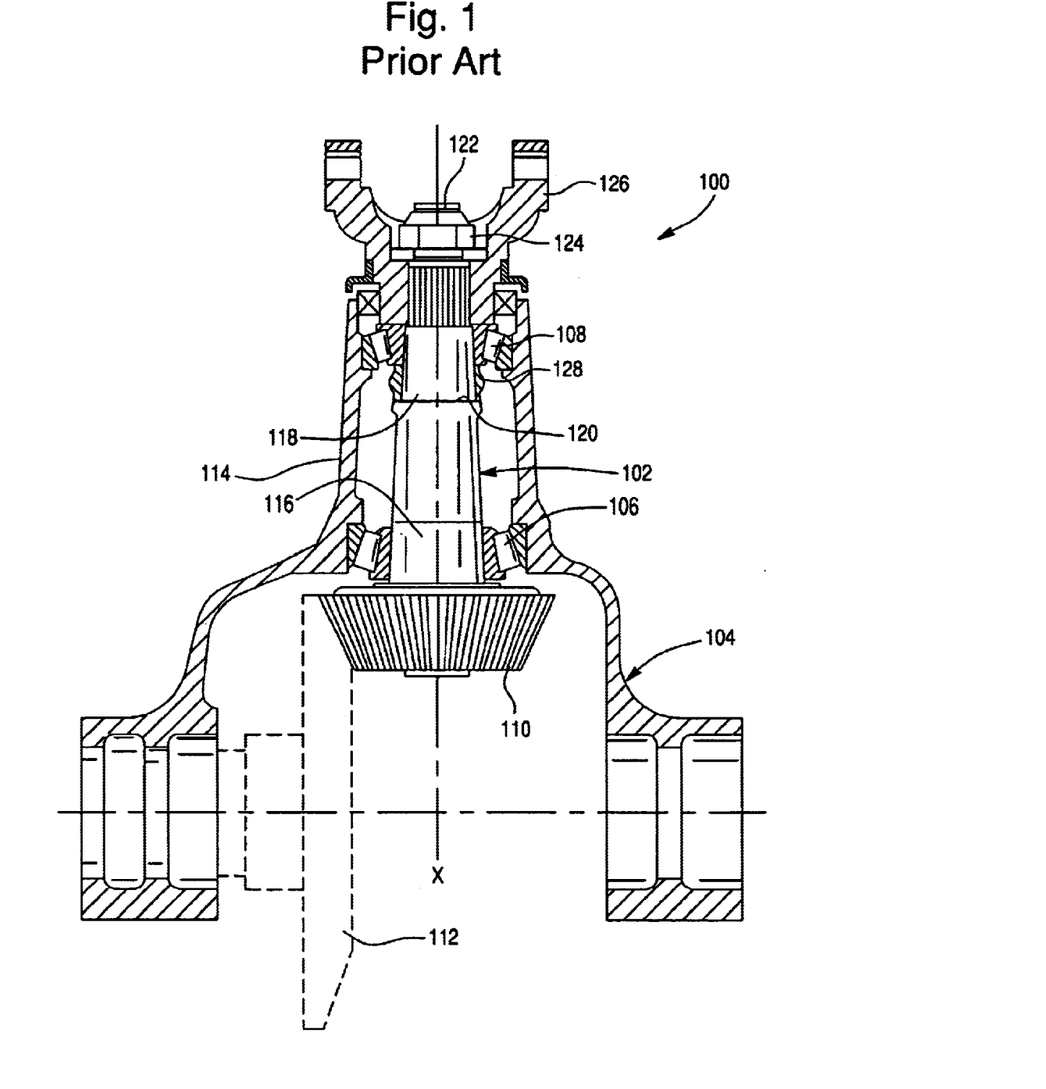
FIG. 1 is a sectional view of a typical differential carrier of the prior art including a pinion shaft mounted on a pair of tapered bearings and preloaded with a conventional collapsible spacer.

Typically, drive shafts in many applications are rotatably mounted within a gear housing through tapered roller bearings. For example, as illustrated in FIG. 1, a pinion shaft 102 driven by an internal combustion engine through a transmission, is rotatably supported in a differential carrier 104 that forms part of a vehicular drive axle. The pinion shaft 102 has at its inner end a beveled pinion gear 110, which meshes with a beveled ring gear 112 in the carrier 104. The ring gear 112 in turn is connected to a differential mechanism (not shown). Here, the mesh of the pinion gear 110 and the ring gear 112 must be proper, lest the differential mechanism will generate excessive noise and wear rapidly. As shown in FIG. 1, the pinion shaft 102 rotates within the differential carrier 104 on inner and outer tapered roller bearings 106 and 108, respectively, which are mounted in opposition to each other along an axis x of rotation.

Typically, the bearings 106 and 108 are set to a condition of preload, so as to impart rigidity to the shaft 102 (rigidity in the sense that the shaft 102 will rotate in the carrier 104 without any radial or axial play) and eliminate all axial and radial free motion between the shaft 102 and the carrier 104, while still allowing rotation with minimum friction within the carrier 104, thus achieving the proper mesh. However, too much preload will cause the bearings 106 and 108 to overheat and fail prematurely. On the other hand, too little preload may cause the bearings to acquire end play, and this likewise decreases the life of the bearings and introduces radial and axial play into the shaft 102.

The pinion shaft 102 extends through a tubular extension 114 on the carrier 104, the axis of which coincides with the axis x. The shaft 102 adjacent to the beveled pinion gear 110 possesses an inner bearing seat 116 around which the inner bearing 106 fits and an outer seat 118 around which the outer bearing 108 fits. The outer seat 118 is considerably longer than the inner seat 116 and terminates at a shoulder 120, which is located between the two seats 116 and 118. At its outer end, the pinion shaft 102 is provided with threads 122 over which a nut 124 is threaded. Indeed, the nut 124 is turned down against the shaft 102 to clamp the bearings 106 and 108 between a drive flange 126 and the pinion gear 110. The extent to which the nut 124 is turned determines the setting for the bearings 106 and 108.

The nut 124 serves to preload the bearings 106 and 108 by advancing the outer bearing 108 over an outer bearing seat 118 on the pinion shaft 102. Initially, before adjustment, the bearings 106 and 108 exist in a state of end play in which the pinion shaft 102 can move both axially and radially with respect to the differential carrier 104 and, of course, rotate as well. As the nut 124 is turned down over the thread 122 at the end of the shaft 102, it forces the outer bearing 108 along the outer bearing seat 118 of the pinion shaft 102. After a short distance the outer bearing 108 encounters a convoluted collapsible spacer 128, which now becomes snugly lodged between the outer bearing 108 and the shoulder 120 at the end of the seat 118. As the advancement continues, still while the bearings 106 and 108 are in a condition of endplay, the spacer 128 collapses. In time, the rollers of the two bearings 106 and 108 seat against the raceways of their respective cups and cones. This represents a condition of zero endplay—a condition in which the shaft 102 cannot shift axially or radially with respect to the housing 102. But some preload is usually desired to insure adequate rigidity or stiffness in the pinion shaft 102 and desired performance from the gears 110 and 112. Hence, the preload setting for the bearings 106 and 108.

The convoluted collapsible spacers for use as a bearing preloading elements are well known to those skilled in the art. Conventionally, the collapsible spacers have a substantially unitary thickness, and are made of a relatively thin strip of metal that is formed into a band and is then further formed so as to be convoluted or undulating in cross section, and are adapted for being compressed to a yield point of the material from which the spacers are made and which will thereafter compress under a substantially constant load for a substantial distance.

Figure 2:
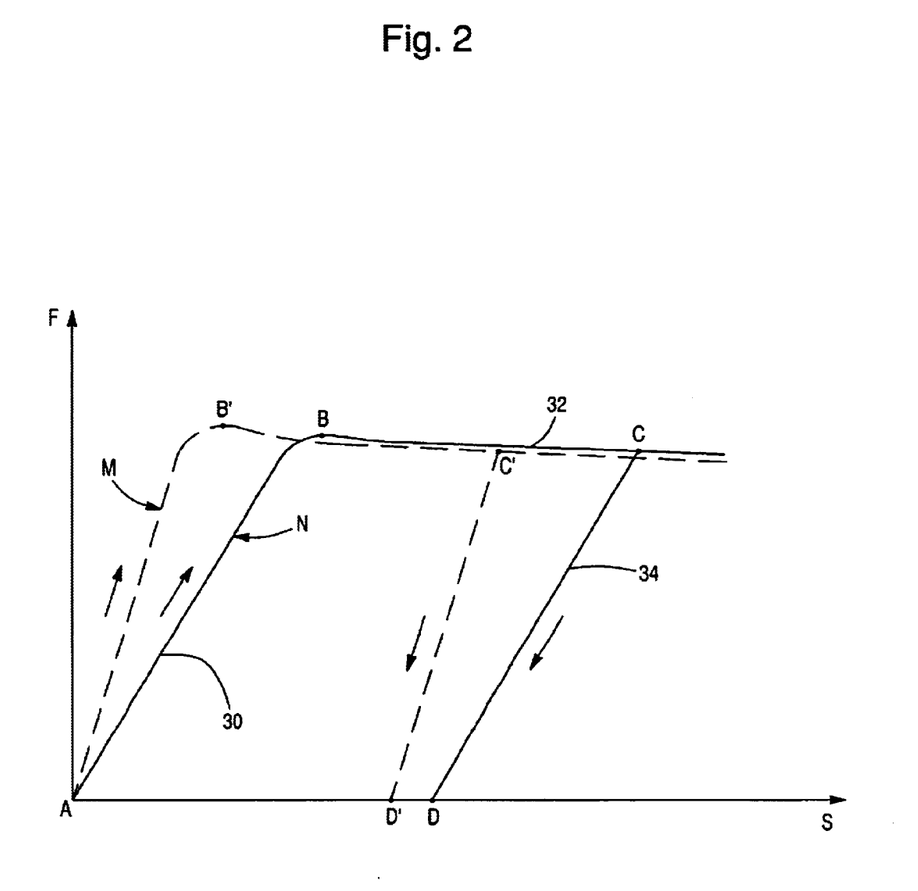
FIG. 2 is a graph showing load-axial deformation curves for the conventional collapsible spacer and a multi-convoluted collapsible spacer of the present invention.

The dash line in the FIG. 2 depicts a graph M showing an axial load F applied upon the conventional collapsible spacer 128 as a function of an axial deformation $\delta$ of the spacer, and illustrates graphically the manner in which the conventional spacer performs when it is compressed. Such a spacer, when compressed in the axial direction, will first deform resiliently, like a spring, with the force required to effect the compression increasing substantially linearly with the amount of compression (section A–B' of the graph M, as indicated by line 130). At a certain amount of compression, a yield strength (or an elastic limit) of the material of the spacer will be reached (point B' of the graph M), and the spacer will thereafter start to undergo plastic deformation and offer substantially constant resistance to deformation up to a point where the spacer commences to flatten out section (from point B' of the graph M on, as indicated by line 132). If at point C' of the graph M, for example, the axial load applied upon the conventional collapsible spacer is released (e.g. by turned the nut 124 up over the thread 122 of the shaft 102 as shown in FIG. 1), the spacer will expand in the axial direction substantially linearly (section C'–D' of the graph M, as indicated by line 34).

However, the conventional convoluted collapsible spacers have a relatively high spring rate, thus the low amount of "spring back". The term "spring back" herein refers to a specific resilient deformation of the collapsible spacer in the direction of the expansion thereof when the axial load applied thereupon is released. As a result, they are very sensitive to wear, and are prone to significant change in the bearing preload during the operation that negatively affects bearing life and pinion position.

Thus, there is a need for a convoluted collapsible spacer having a low spring rate, hence less sensitivity to wear and maladjustment.

SUMMARY OF THE INVENTION

The present invention provides a novel low spring rate multi-convoluted collapsible spacer adapted for use as a bearing preloading element. The multi-convoluted collapsible spacer in accordance with the present invention comprises a substantially tubular body compressible in an axial direction thereof from a predetermined free length to a substantially shorter length. The tubular body includes a yielding zone and an elastic zone adjacent to said yielding zone. Each of the yielding and elastic zones has at least one convolution curved in the same radial direction and interconnected with a central convolution curved in the opposite radial direction to the convolutions of the yielding and elastic zones.

Preferably, each of the yielding zone and the elastic zone of the collapsible spacer of the present invention has one convex convolution interconnected with the central concave convolution.

Moreover, in accordance with the present invention, the tubular body of the collapsible spacer of the present invention has a substantially variable thickness in the axial direction. More specifically, an average thickness of the body of the collapsible spacer in the elastic zone is substantially greater than an average thickness of the body in the yielding zone. Such an arrangement provides the collapsible spacer a substantially higher resiliency in the axial direction in the elastic zone than in the yielding zone. As a whole, the novel collapsible spacer has a lower spring rate, as compared to the conventional collapsible spacers, thus larger amount of "spring back".

Furthermore, in accordance with the preferred exemplary embodiment of the present invention, the convolutions of the yielding zone and the elastic zone of the spacer have substantially the same outside diameter.

In the alternative embodiment, an outside diameter of the convolution of the yielding zone is substantially smaller than an outside diameter of the elastic zone of the spacer.

Therefore, the multi-convoluted collapsible spacer in accordance with the present invention represents a novel arrangement of the multi-convoluted collapsible spacer providing less sensitivity to wear and maladjustment that allows reliable bearing preloading and drastically reduces the labor cost of assembling and preloading of the tapered bearings in the various gear mechanisms.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 3:
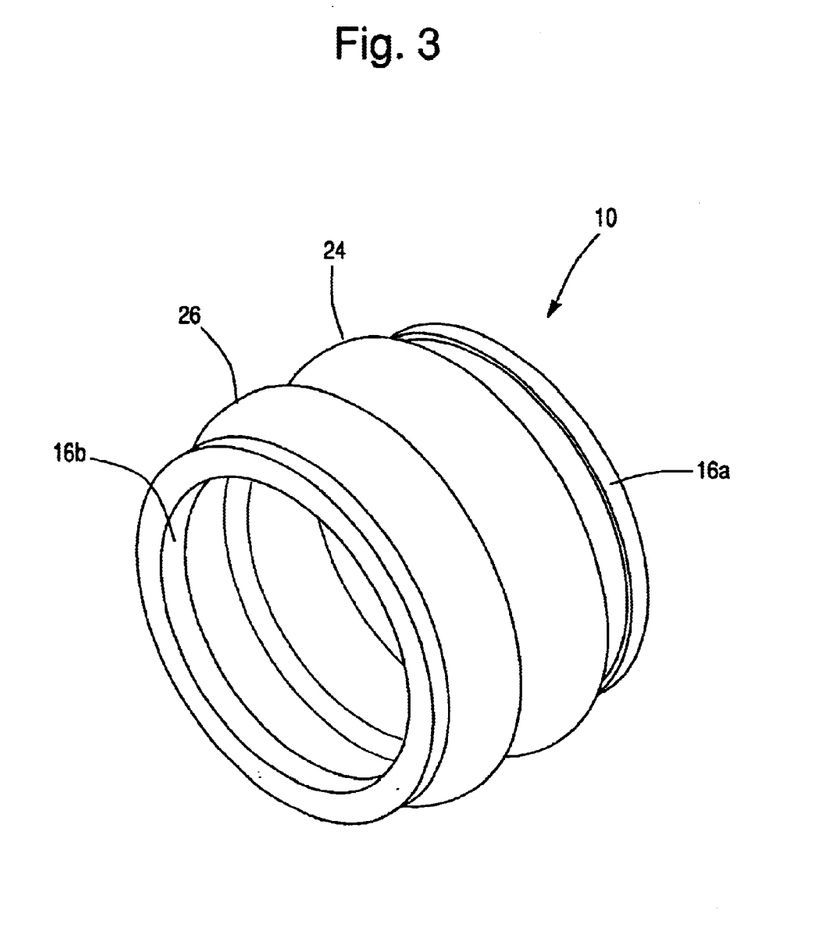
FIG. 3 is a perspective view of the multi-convoluted collapsible spacer in accordance with the preferred embodiment of the present invention.
Figure 4:
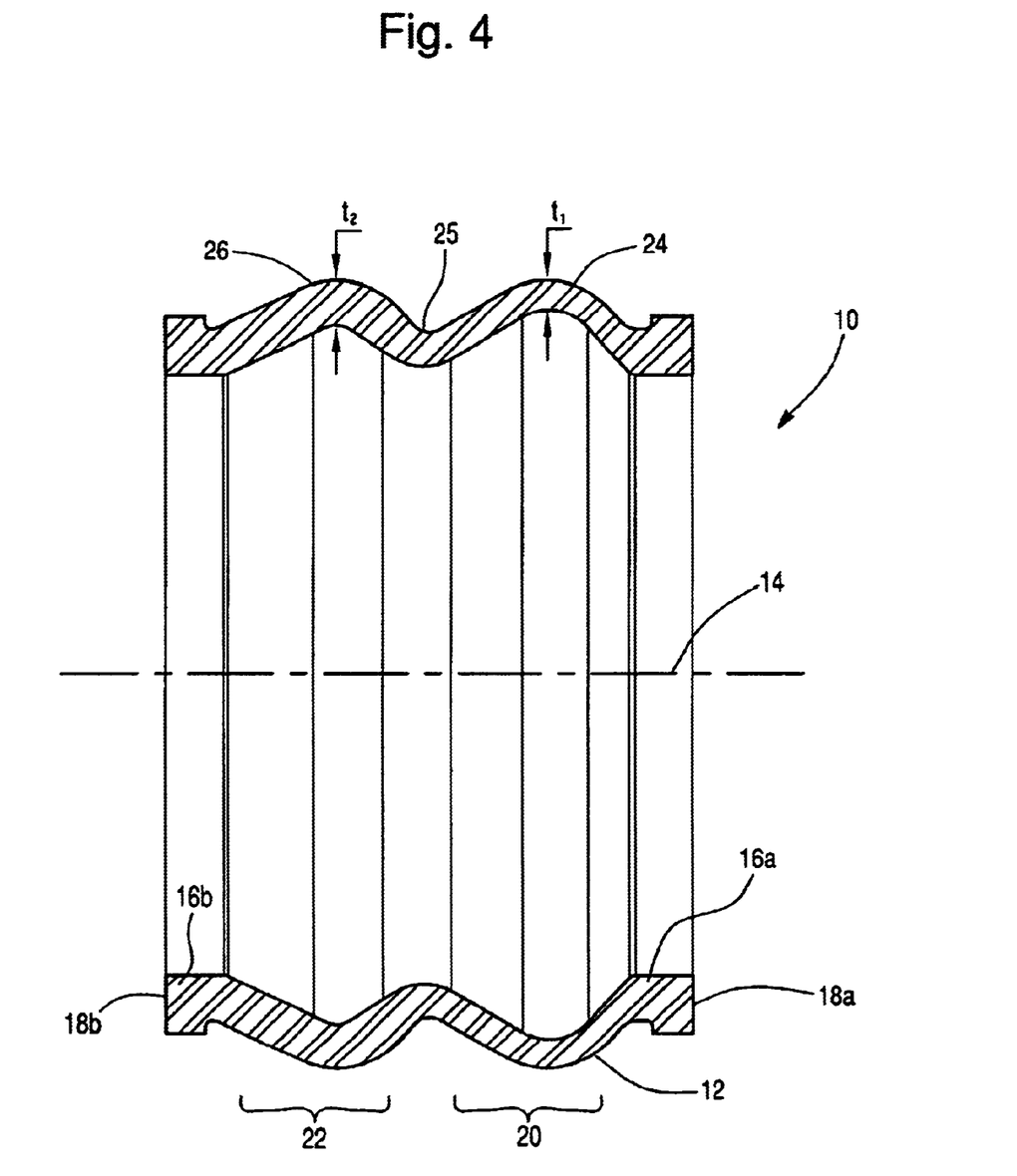
FIG. 4 is a sectional view of the multi-convoluted collapsible spacer in accordance with the preferred embodiment of the present invention.

FIGS. 3 and 4 show a substantially tubular multi-convoluted collapsible spacer 10 according to the present invention before assembly with members, which it is to engage and be compressed between. The collapsible spacer 10 has a substantially tubular body 12 formed of a strip of metal pressed or rolled to the desired configuration defining an axis of symmetry (or a central axis) 14 defining an axial direction of the spacer 10. The collapsible spacer 10 is compressible in the axial direction thereof (the direction of the central axis 14) from a predetermined free length to a substantially shorter length. Preferably, the material of the body 12 of the collapsible spacer 10 is a strong ductile metal, such as precipitation hardening nickel alloys, or austenitic stainless steels, which will sustain substantial deformation without fracture. The body 12 of the collapsible spacer 10 is rolled into a tubular configuration from the metal strip by forming rolls, and, thereafter, the body 12 may be stress relieved by annealing, and may be hardened to a desired degree by heat treatment.

The spacer 10 has axially opposite end portions 16a and 16b each including a substantially annular contact face 18a and 18b, respectively. The contact faces 18a and 18b lie in planes substantially parallel with each other and substantially perpendicular to the central axis 14.

As illustrated in FIG. 3, the collapsible spacer 10 consists of smoothly joined curved convolutions. In the uncompressed condition in which the element is shown in FIGS. 3 and 4, the contact faces 18a and 18b are substantially parallel with each other. Preferably, the material of the collapsible spacer 10 is a strong ductile metal, such as precipitation hardening nickel alloys, or austenitic stainless steels, which will sustain substantial deformation without fracture.

As further illustrated, the tubular body 12 of the collapsible spacer 10 includes a substantially tubular yielding zone 20 adjacent to one end portion 16a thereof, and a substantially tubular elastic zone 22 adjacent to the other end portion 16b thereof. The yielding zone 20 includes at least one convolution 24. Similarly, the elastic zone 22 includes at least one convolution 26 integrally connected to the convolution 24 via a central convolution 25. It will be appreciated by those skilled in the art that the specific number of convolutions in the yielding zone 20 or in the elastic zone 22 may be subject to variation depending on the particular application. However, preferably, as illustrated in FIG. 4, each of the yielding zone 20 and the elastic zone 22 of the collapsible spacer 10 of the present invention has one convex convolution 24 or 26, respectively.

Preferably, as shown in FIG. 4, the convolutions 24 and 26 are both Convex radially outwardly, while the central convolution 25 is concave radially inwardly. It will be appreciated that the respective convolutions may be concave toward the outside or inside of the body 12 of the spacer 10, although the convolutions in any case will alternate with regard to the direction of concavity.

Moreover, as illustrated in FIG. 4, the tubular body 12 of the collapsible spacer 10 of the present invention has a substantially variable thickness in the direction of the axis 14. Furthermore, in accordance with the present invention, an average thickness of the body 12 in the elastic zone 22 is substantially greater than an average thickness of the body 12 in the yielding zone 20. Correspondingly, as clearly shown in FIG. 4, a thickness $t_2$ of the body 12 at an apex of the convolution 26 of the elastic zone 22 is substantially greater than a thickness $t_1$ of the body 12 at an apex of the convolution 24 of the yielding zone 20. Due to its greater average thickness, the tubular body 12 of the spacer 10 displays substantially higher elasticity in the zone 22 than in the zone 20. In the exemplary embodiment illustrated in FIG. 4, the body 12 in the elastic zone 22 is in average as much as 1.5 mm thicker than in the yielding zone 20. It will be appreciated that the specific difference in the average thickness of the body 12 of the spacer 10 between the yielding zone 20 and the elastic zone 22 is the subject to variation.

In the preferred exemplary embodiment of the present invention, illustrated in FIGS. 2 and 3, the convolutions 24 and 26 of the yielding zone 20 and the elastic zone 22 of the spacer 10 have substantially the same outside diameter.

Figure 5:
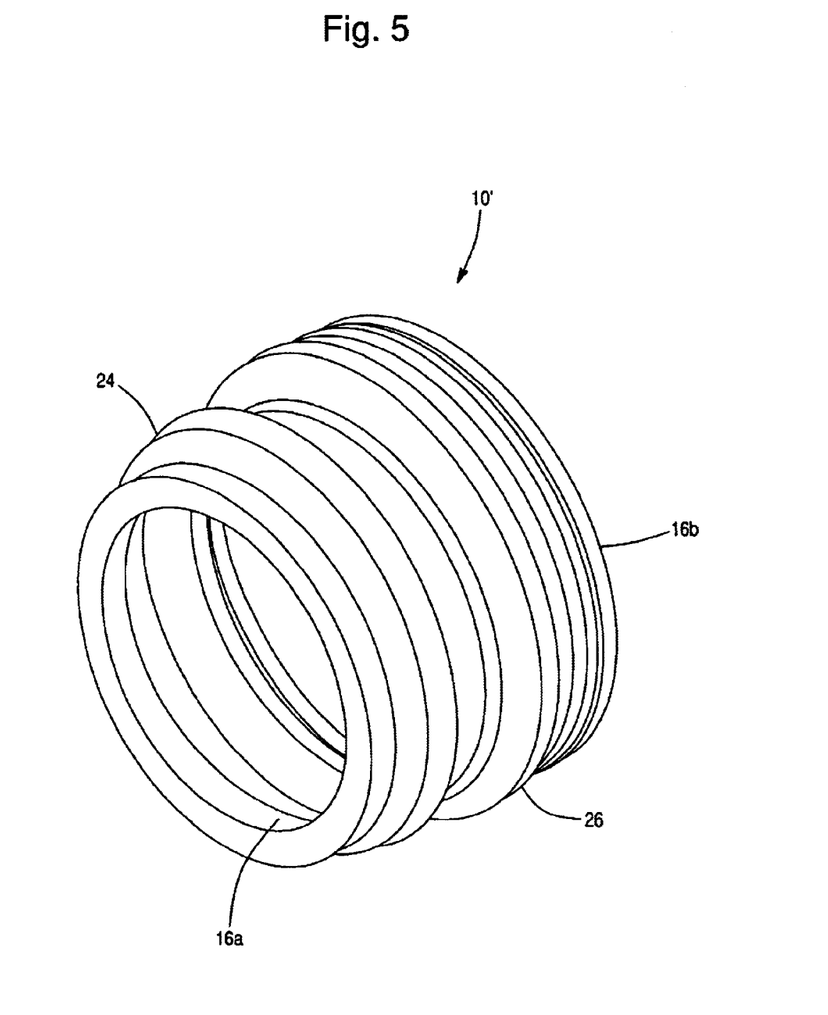
FIG. 5 is a perspective view of the multi-convoluted collapsible spacer in accordance with the alternative embodiment of the present invention.
Figure 6:
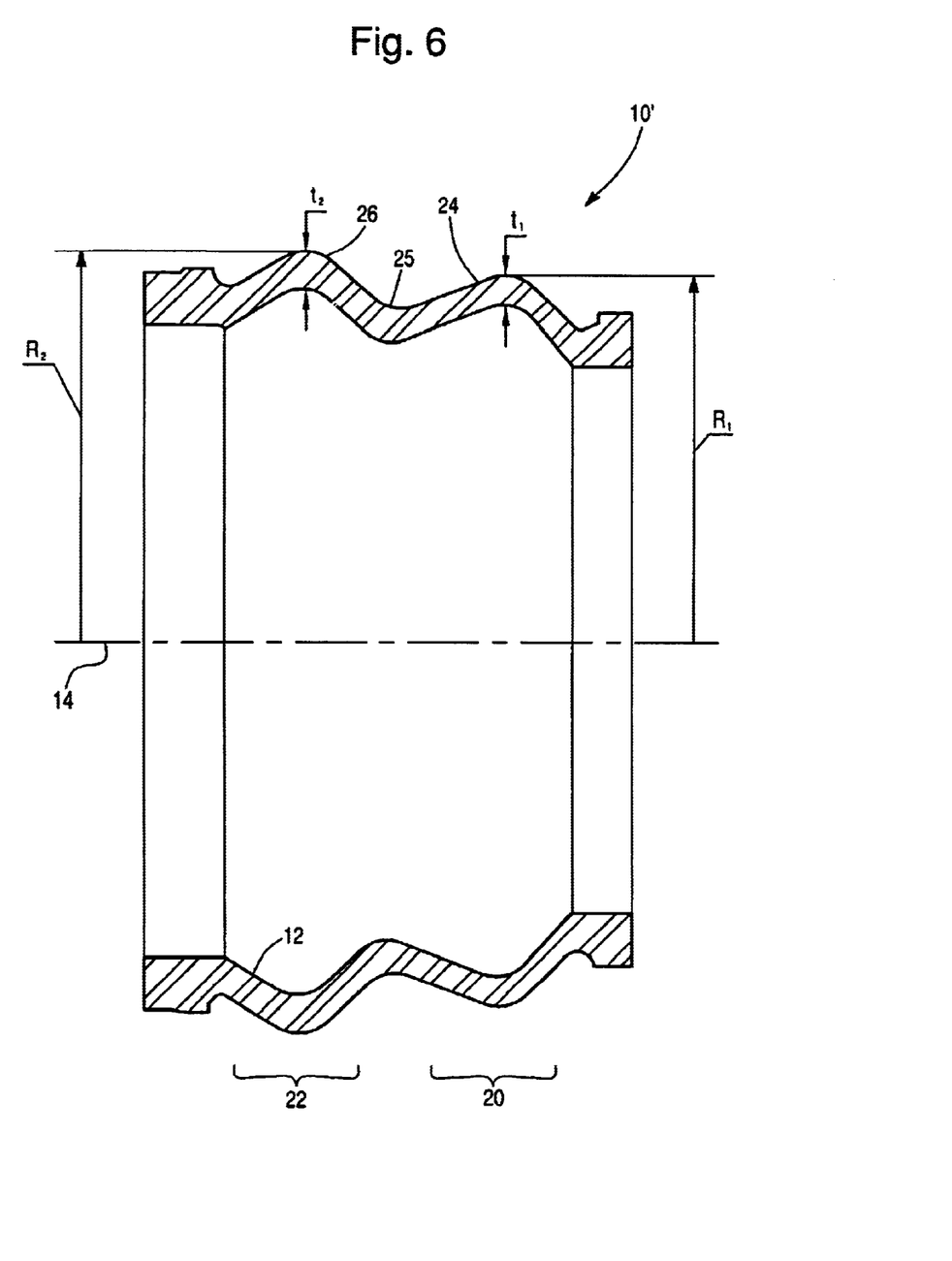
FIG. 6 is a sectional view of the multi-convoluted collapsible spacer in accordance with the alternative embodiment of the present invention.

FIGS. 5 and 6 illustrate a multi-convoluted collapsible spacer 10' of the alternative embodiment of the present invention. Components, which are unchanged from, or function in the same way as in the preferred exemplary embodiment depicted in FIGS. 3 and 4 are labeled with the same reference numerals without describing detail since similarities between the corresponding parts in the two embodiments will be readily perceived by the reader. The main difference of the solution of FIGS. 5 and 6 with respect to that of FIGS. 3 and 4 lies in that in this case an outside radius $R_1$ of the convolution 24 of the body 12 in the yielding zone 20 is substantially smaller than an outside radius $R_2$ of the convolution 26 of the body 12 in the elastic zone 22 of the spacer 10.

The solid line in the FIG. 2 depicts a graph N showing an axial load F applied upon the collapsible spacer 10 as a function of an axial deformation δ of the spacer 10, and illustrates graphically the manner in which the spacer 10 of the present invention performs when it is compressed. Initially, when the body 12 of the collapsible spacer 10 is compressed in the axial direction 14, both the convolution 24 of the yielding zone 20 and the convolution 26 of the elastic zone 22 thereof will first deform resiliently, like a spring, with the force required to effect the compression increasing substantially linearly with the amount of compression (section A–B of the graph N, as indicated by line 30). At a certain amount of compression, a yield strength (or an elastic limit) of the material of the spacer 10 will be reached (point B of the graph N), and the convolution 24 of the yielding zone 20 of the spacer 10 will thereafter start to undergo plastic deformation and offer substantially constant resistance to deformation up to a point where the spacer commences to flatten out section (from point B of the graph N on, as indicated by line 32), while the convolution 26 of the elastic zone 22 will remain elastically deformed. If at point C of the graph N, for example, the axial load applied upon the collapsible spacer 10 is released (e.g. by turned the nut 138 up over the thread 136 of the shaft 102 as shown in FIG. 1), the spacer 10 will expand in the axial direction substantially linearly (section C–D of the graph N, as indicated by line 34) exhibiting much lower spring rate than the conventional collapsible spacers, as represented by the graph M in FIG. 1, due to elasticity of the elastic section 22. It should be noted that the line 30 of the graph N is substantially parallel to the line 34 thereof It will be appreciated that the low spring rate multi-convoluted collapsible spacer 10 of the present invention may be compressed and released repeatedly, and each time that the spacer 10 is compressed along the line 32, the return line 34 when it is released will remain parallel to the line 30, but displaced rightward on the graph. The load-deformation characteristic of the spacer 10 will, thus, be maintained substantially constant throughout the axial deformation of the spacer 10 until the convolutions of the spacer start to collapse on each other.

Therefore, the multi-convoluted collapsible spacer 10 in accordance with the present invention represents a novel arrangement of the multi-convoluted collapsible spacer providing a low spring rate compared to the comparable conventional collapsible spacers, hence less sensitivity to wear and maladjustment that allows reliable bearing preloading and drastically reduces the labor cost of assembling and preloading of the tapered bearings in the various gear mechanisms.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A low spring rate collapsible spacer comprising:
   a substantially tubular body compressible in an axial direction thereof from a predetermined free length to a substantially shorter length;
   said body including a yielding zone and a elastic zone adjacent to said yielding zone;
   said yielding zone having at least one convolution and said elastic zone having at least one convolution curved in the same radial direction;
   wherein an average thickness of said body in said elastic zone is different than an average thickness of said body in said yielding zone.

2. The collapsible spacer as defined in claim 1, wherein said average thickness of said body in said elastic zone is greater than said average thickness of said body in said yielding zone.

3. The collapsible spacer as defined in claim 1, wherein said at least one convolution of said yielding zone is a convex convolution, and said at least one convolution of said elastic zone is a convex convolution.

4. The collapsible spacer as defined in claim 3, further including a central concave convolution connecting said at least one convex convolution of said yielding zone to said at least one convex convolution of said elastic zone.

5. The collapsible spacer as defined in claim 1, wherein said at least one convolution of said yielding zone and said at least one convolution of said elastic zone are curved in the same radial direction.

6. The collapsible spacer as defined in claim 5, further including a central convolution connecting said at least one convolution of said yielding zone to said at least one convolution of said elastic zone, said central convolution being curved in the opposite radial direction to said convolutions of said yielding and elastic zones.

7. The collapsible spacer as defined in claim 1, wherein said yielding zone is adjacent to one end portion of said tubular body of said collapsible spacer and said elastic zone is adjacent to the other end portion thereof.

8. The axle assembly as defined in claim 1, wherein a thickness of said body varies in said axial direction.

9. The axle assembly as defined in claim 1, wherein an outside diameter of said at least one convex convolution of said body in said elastic zone substantially equals to an outside diameter of said at least one convex convolution of said body in said yielding zone.

10. The axle assembly as defined in claim 1, wherein an outside diameter of said at least one convex convolution of said body in said elastic zone is substantially greater than an outside diameter of said at least one convex convolution of said body in said yielding zone.

11. A low spring rate collapsible spacer comprising:

a substantially tubular body compressible in an axial direction thereof from a predetermined free length to a substantially shorter length, a thickness of said body varying in said axial direction;

said body including a yielding zone and a elastic zone adjacent to said yielding zone;

said yielding zone is adjacent to one end portion of said tubular body of said collapsible spacer and said elastic zone is adjacent to the other end portion thereof;

each of said yielding zone and said elastic zone having a convex convolution interconnected through a central concave convolution;

wherein an average thickness of said body in said elastic zone is greater than an average thickness of said body in said yielding zone, and wherein an outside diameter of said at least one convex convolution of said body in said elastic zone equals to an outside diameter of said at least one convex convolution of said body in said yielding zone.

12. A low spring rate collapsible spacer comprising:

a substantially tubular body compressible in an axial direction thereof from a predetermined free length to a shorter length, a thickness of said body varying in said axial direction;

said body including a yielding zone and a elastic zone adjacent to said yielding zone;

said yielding zone is adjacent to one end portion of said tubular body of said collapsible spacer and said elastic zone is adjacent to the other end portion thereof;

each of said yielding zone and said elastic zone having a convex convolution interconnected through a central concave convolution;

wherein an average thickness of said body in said elastic zone is greater than an average thickness of said body in said yielding zone, and wherein an outside diameter of said at least one convex convolution of said body in said elastic zone is greater to an outside diameter of said at least one convex convolution of said body in said yielding zone.

* * * * *